United States Patent [19]

Marterer

[11] Patent Number: 4,543,824
[45] Date of Patent: Oct. 1, 1985

[54] BAROMETER

[75] Inventor: Karl Marterer, Wertheim-Waldenhausen, Fed. Rep. of Germany

[73] Assignee: Dostmann GmbH & Co. KG, Wertheim-Reicholzheim, Fed. Rep. of Germany

[21] Appl. No.: 604,231

[22] Filed: Apr. 26, 1984

[30] Foreign Application Priority Data

Apr. 26, 1983 [DE] Fed. Rep. of Germany ....... 3315093

[51] Int. Cl.$^4$ ................................. G01L 7/12
[52] U.S. Cl. .......................................... 73/386; 73/729
[58] Field of Search ................. 73/386, 387, 729, 715, 73/384

[56] References Cited

U.S. PATENT DOCUMENTS

| | | | |
|---|---|---|---|
| 32,329 | 5/1861 | Wootten | 73/715 |
| 32,514 | 6/1861 | Finnegan | 73/715 |
| 2,017,183 | 10/1935 | Nutsford | 73/386 |

Primary Examiner—Donald O. Woodiel
Attorney, Agent, or Firm—Oblon, Fisher, Spivak, McClelland & Maier

[57] ABSTRACT

A barometer which includes a vacuum housing, a pivotably supported pointer shaft, a return spring for the pointer shaft and a transmission mechanism, which exhibits a pivotably supported output shaft, which runs perpendicular to the surface of the vacuum housing and whose pivoting is coupled with that of the pointer shaft, and has a helical element, so that the translational movement of the vacuum housing is converted into a pivoting movement of the output shaft by the cooperation between the helical element and the output shaft. The helical element (32) is made integral with the instrument, the output shaft (22) can both pivot and be axially displaced and the output shaft rests with an end portion thereof turned toward the vacuum housing and contacting (4) the vacuum housing and is held in this position by return spring (28). The transmission mechanism exhibits, in the form of the output shaft, only one movable part.

1 Claim, 2 Drawing Figures

1

BAROMETER

BACKGROUND OF THE INVENTION

1. Field of the Invention

The invention relates to a barometer.

2. Description of the Prior Art

Barometers with vacuum housings, known in numerous different embodiments, are designated aneroid barometers. The vacuum housing of these barometers is generally made solid with the instrument on one side, so that the metal diaphragm on the other side of the vacuum housing makes a corresponding movement in case of a change in air pressure. This translational movement or deflection is transmitted by a transmission mechanism to a pointer on a pointer shaft whose position can be read on a dial. The transmission mechanism must magnify the small deflections of the vacuum for reading and for this purpose has a great transformation ratio. The transmission mechanisms of known barometers generally comprise several levers which are made as one-armed, two-armed levers or angle levers, and elements made as chains, wires or tooth segments which finally transmit the movements from the lever mechanism to the pointer shaft. These transmission mechanims therefore consist of comparatively many parts, so that their production and assembly cost is high.

Further, a barometer is known (DE-AS No. 26 16 315), which already exhibits a simplified transmission mechanism. With this known barometer, the helical element is made like a helical spring. It is placed coaxially with the output shaft on the vacuum box and participates in its deflection. The helical element works with the output shaft through a pin that projects radially from the output shaft between the windings of the helical element. When the helical element is moved during the translational movement of the vacuum housing, it forces the output shaft, which is axially integral with the instrument, to perform a pivoting motion which is also imparted to the pointer shaft which in turn is unitary with the output shaft. Although the transmission mechanism of this known barometer offers lower production cost in comparison with the transmission mechanisms described in the introduction, a further reduction of production and assembly cost is desirable. Moreover, this known barometer has the drawback that its transmission mechanism functions in a comparatively inaccurate manner.

SUMMARY OF THE INVENTION

The object of this invention is to make a barometer of this kind in such a way that it exhibits a design of the transmission mechanism that is as simple as possible.

This object is achieved according to the invention in that the helical element is unitary with the instrument, the output shaft, besides being able to pivot, is axially displaceable and the output shaft, with its end turned toward the vacuum box, rests on the vacuum housing, and is held in this position by the return spring.

In the barometer according to the invention, the only movable element of the transmission mechanism is the output shaft. Since, on the one hand, it directly follows the translational movement of the vacuum housing and, on the other hand, also performs pivoting, it is not necessary, in the barometer according to the invention, to support the output shaft against axial displacement and connect the helical element with the vacuum housing fixedly in pivoting but which is axially displaceable. This requirement is specified in the barometer according to DE-AS No. 26 16 315. In contrast, the barometer according to the invention is considerably simplified.

In a preferred embodiment, it can be provided that the output shaft and the pointer shaft are made as one piece, so that in practice the pointer shaft rests with the end turned toward the vacuum housing and the transmission mechanism requres no additional pivoting parts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
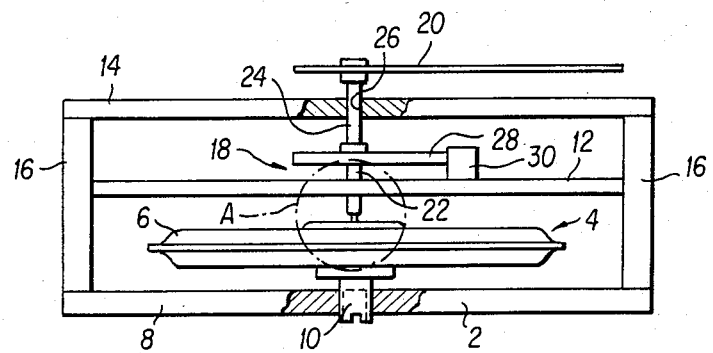
FIG. 1 is a side view of an embodiment of the barometer according to the invention.

FIG. 1 shows a barometer in a side view in which, however, the casing, glass cover and dial have been omitted for presentation and explanation.

The barometer represented comprises an essentially round bedplate or base plate 2, which supports a vacuum housing 4. Vacuum housing 4, in FIG. 1, consists of an upper metal diaphragm 6 and a lower metal diaphragm 8, which are hermetically joined at their edge, and is evacuated to a high degree. Both metal diaphragms 6 and 8 have such a prestress that vacuum housing 4 does not need any support spring, i.e., it is stabilized. A threaded pin 10 is fastened in the middle of lower metal diaphragm 8; is screwed into a tapped hole (not numbered) in base plate 2 and exhibits a slot at its free end for application of a suitable tool, for example, a screwdriver. By turning threaded pin 10 in its corresponding tapped hole, the position of vacuum housing 4 can be adjusted in relation to base plate 2.

A middle plate 12 and an upper plate 14 run above and parallel to base plate 2 and are solidly connected to base plate 2 by columns 16. Vacuum housing 4 is centered in relation to base plate 2. On the side of vacuum housing 4 turned away from base plate 2 is also centered a transmission mechanism 18, which serves to transmit movement or deflection of the vacuum housing, in the form of pivoting pointer 20, which is placed above plate 14 (FIG. 1). The transmission mechanism comprises an output shaft 22, which is placed perpendicular to vacuum box 4 and is centered in relation to it. Output shaft 22 is made unitary with a coaxial pointer shaft 24, which is pivotably mounted on upper plate 14 via a bearing 26, which allows displacement of pointer shaft 24 in the axial direction in relation to plate 14. Pointer shaft 24 projects above plate 14 with its upper end shown in FIG. 1. Pointer 20 is placed on this upper end of pointer shaft 24 and made solid with it in pivoting movement. To pointer shaft 24 is applied a helical return spring 28 which is placed essentially parallel between upper plate 14 and middle plate 12. Return spring 28 is fastened by one of its ends to pointer shaft 24 and is fixedly attached with the instrument by a lug 30 to a middle plate 12 by its other end. Return spring 28 is under such prestress that it seeks to turn pointer shaft 24 counterclockwise, looking at the barometer shown in the side view in FIG. 1 from above.

Figure 2:
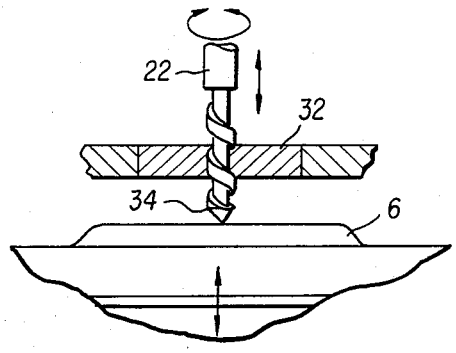
FIG. 2 is an enlarged representation of detail A of FIG. 1.

As FIG. 2 shows, output shaft 22 exhibits on its lower end and exterior thread in the form of a trapezoidal thread which engages with a corresponding interior thread in a helical element 32 that is fixed with the barometer. Helical element 32, for example, as is the case in the embodiment shown, can be fixed to middle plate 12. In FIG. 2, output shaft 22 exhibits at its lower end a tapered point 34 by which output shaft 22 rests directly on the upper metal diaphragm 6 of vacuum housing 4. Because of the prestress of return spring 28, point 34 is permanently held in this position.

If vacuum housing 4 expands slightly because of a drop in atmospheric pressure, upper metal diaphragm 6 is deflected slightly upward from the position shown in FIG. 2. In this process, diaphragm 6 pushes upward against point 34, so that output shaft 22, in FIG. 2, is shoved slightly upward, and this translational movement, because of the engagement between the interior and exterior threads on output shaft 22 or helical element 32, is necessarily accompanied by pivoting of output shaft 22. Because output shaft 22 and pointer shaft 24 are unitary, this pivoting is directly transmitted by pointer 20. If the upper metal diaphragm 6 moves downward (FIG. 2) because of a change in atmospheric pressure, point 34 of output shaft 22 follows this movement, since return spring 28 exerts a corresponding torsional moment on output shaft 22 and the resulting pivoting, because of the engagement between the interior and exterior threads, is necessarily accompanied by axial displacement of output shaft 22.

As appears from the above description, the combination of the output shaft 22 and the pointer shaft 24 is radially supported to two places, i.e., by a bearing 26 and a helical element 32. Axially, this unit is supported only on helical element 32, so that, because of the feature of the engagement between helical element 32 and output shaft 22, both axial displacement and, at the same time, pivoting are possible. The design of the exterior thread of output shaft 22 and the interior thread of helical element 32 are so selected that relative movement with the least possible friction is possible and the desired deflection of pointer 20 corresponds to the resulting deflection of upper metal diaphgram 6.

In the barometer described above, output shaft 22 and pointer shaft 24 are not only able to pivot but are also axially displaceable, which makes an extremely simple design for the transmission mechanism 18 possible. The axial displacement of pointer shaft 24 and therefore the displacement of pointer 20 relative to plate 14 and relative also to the dial (not shown), practically does not impair readibility.

Obviously, numerous modifications and variations of the present invention are possible in light of the above teachings. It is thereofore to be understood that within the scope of the appended claims, the invention may be practiced otherwise than as specifically described herein.

What is claimed as new and desired to be secured by Letters Patent of the United States is:

1. A barometer comprising:
   a frame including an upper plate and a middle plate parallel therewith;
   a vacuum housing supported by said frame;
   an output shaft resting directly on a portion of said vacuum housing which moves in an axial direction of said output shaft in response to a change in barometric pressure;
   a pointer shaft unitary and coaxial with said output shaft;
   an exterior threaded portion having exterior helical trapezoidal threads on said output shaft;
   an interior threaded portion having interior trapezoidal threads on said middle plate, said interior threads engaging said exterior threads to permit rotation and axial movement of said output shaft relative to said frame;
   a bearing in said upper plate for supporting said pointer shaft for rotational and axial movement; and
   return spring means operatively associated with said output shaft for biasing said output shaft in a rotational position such that said output shaft remains in engagement with said housing as barometric pressure changes.

* * * * *